US011055379B2

(12) United States Patent
Gudovskiy et al.

(10) Patent No.: US 11,055,379 B2
(45) Date of Patent: Jul. 6, 2021

(54) INFORMATION PROCESSING METHOD, INFORMATION PROCESSING APPARATUS, AND COMPUTER-READABLE RECORDING MEDIUM

(71) Applicant: Panasonic Intellectual Property Corporation of America, Torrance, CA (US)

(72) Inventors: Denis A. Gudovskiy, Emeryville, CA (US); Luca Rigazio, Campbell, CA (US); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 119 days.

(21) Appl. No.: 16/513,666

(22) Filed: Jul. 16, 2019

(65) Prior Publication Data

US 2019/0340214 A1    Nov. 7, 2019

Related U.S. Application Data

(63) Continuation of application No. PCT/JP2018/015015, filed on Apr. 10, 2018.
(Continued)

(51) Int. Cl.
*G06F 17/15* (2006.01)
*G06N 3/04* (2006.01)
*G06N 3/08* (2006.01)

(52) U.S. Cl.
CPC .............. *G06F 17/15* (2013.01); *G06N 3/04* (2013.01); *G06N 3/08* (2013.01)

(58) Field of Classification Search
CPC . G06F 17/15; G06N 3/04; G06N 3/08; G06N 3/063; G06N 3/0454
(Continued)

(56) References Cited

U.S. PATENT DOCUMENTS

| 5,473,730 A | 12/1995 | Simard |
| 9,747,548 B2* | 8/2017 | Ross ................... G06F 15/8046 |
| 10,311,342 B1* | 6/2019 | Farhadi ..................... G06K 9/52 |

FOREIGN PATENT DOCUMENTS

| JP | 6-259585 | 9/1994 |
| JP | 7-191950 | 7/1995 |

OTHER PUBLICATIONS

International Search Report of PCT application No. PCT/JP2018/015015 dated Jul. 17, 2018.
(Continued)

*Primary Examiner* — Tan V Mai
(74) *Attorney, Agent, or Firm* — Greenblum & Bernstein, P.L.C.

(57) ABSTRACT

An information processing method includes: inputting an input tensor indicating data to a processor having a memory; causing the processor to perform, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation; and outputting, as an output tensor, the elements of the input tensor on which the convolution operation processing is performed.

7 Claims, 12 Drawing Sheets

Related U.S. Application Data

(60) Provisional application No. 62/487,684, filed on Apr. 20, 2017.

(58) Field of Classification Search
USPC .......................................................... 708/420
See application file for complete search history.

(56) References Cited

OTHER PUBLICATIONS

Philipp Gysel et al., "Hardware-Oriented Approximation of Convolutional Neural Networks", arXiv:1604.03168, Apr. 11, 2016.

* cited by examiner

FIG. 5

Algorithm 1 Conversion to Power-of-Two Format

1:   $l \in \{\tilde{c}, c, h_f, w_f\}$
2:   Initialize: $\tilde{w}_l = 0, r = w_l/\max(\text{abs}(\mathbf{W}))$
3:   for n = 0...N - 1 do
4:      $q_{sgn} = \text{sgn}(r)$
5:      $q_{log} = \log_2 |r|$
6:      $q_{idx} = \lfloor q_{log} \rfloor$
7:      $b_{log} = q_{idx} + \log_2 1.5$
8:      if $q_{log} > b_{log}$ then
9:         $q_{idx}$++
10:     $q = q_{sgn} 2^{q_{idx}}$
11:     $\text{idx}_l(n) = q_{sgn}(1-q_{idx})$
12:     if $q_{idx} \leq -(\lceil M/2 \rceil + n)$ then
13:        $q = 0$
14:        $\text{idx}_l(n) = 0$
15:     $r \mathrel{-}= q$
16:     $\tilde{w}_l \mathrel{+}= q$

FIG. 7

Algorithm 2 Scheduling and Control Logic
1: for $h = 1 \ldots H$ and $w = 1 \ldots W$ do
2:    read input vector $x = X_{h,w}$
3:    precompute matrix $P = P_{h,w}$ and write it into length-$((M-1)C)$ memory
4:    for $\tilde{c} = 1 \ldots \tilde{C}$ do
5:      wright bias $b_{\tilde{c}}$ to the output tensor $Y_{\tilde{c},h,w}$
6:      for $n = 1 \ldots N$ do
7:        for $h_f = 1 \ldots H_f$ and $w_f = 1 \ldots W_f$ do
8:          select value from $\{0, P\}$ using idxi(n)
9:          add value to the output tensor $Y_{\tilde{c},h,w}$

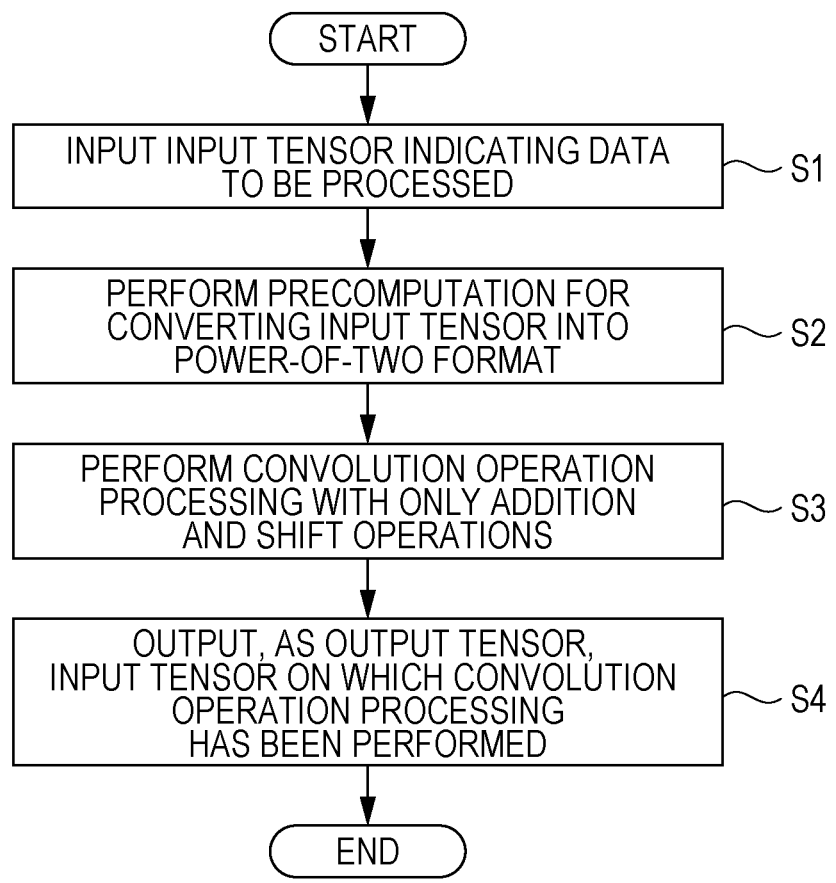

FIG. 10

| Network | Shifts, N | Bit-width, B | Top-1 Accuracy | Top-5 Accuracy | Decrease in Top-1 Accuracy | Decrease in Top-5 Accuracy |
|---|---|---|---|---|---|---|
| SqueezeNet base | - | 32 | 58.4% | 81.02% | | |
| SqueezeNet | 1 | 4 | 23.01% | 45.93% | 35.39% | 35.09% |
| SqueezeNet | 2 | 4 | 57.39% | 80.31% | 1.01% | 0.71% |
| SqueezeNet | 3 | 4 | 58.39% | 81.01% | 0.01% | 0.01% |
| GoogleNet base | - | 32 | 68.9% | 89.15% | | |
| GoogleNet | 1 | 4 | 57.67% | 81.79% | 11.26% | 7.36% |
| GoogleNet | 2 | 4 | 68.54% | 88.86% | 0.39% | 0.29% |
| GoogleNet | 3 | 4 | 68.88% | 89.06% | 0.05% | 0.09% |
| ResNet-18 base | - | 32 | 64.78% | 86.13% | | |
| ResNet-18 | 1 | 4 | - | - | | |
| ResNet-18* | 1 | 4 | 24.61% | 47.02% | 40.17% | 39.11% |
| ResNet-18 | 2 | 4 | 61.57% | 84.08% | 3.21% | 2.05% |
| ResNet-18* | 2 | 4 | 64.24% | 85.79% | 0.54% | 0.34% |
| ResNet-18 | 3 | 4 | 64.69% | 85.97% | 0.09% | 0.16% |
| ResNet-18* | 3 | 4 | 64.75% | 86.01% | 0.03% | 0.12% |
| ResNet-50 base | - | 32 | 72.87% | 91.12% | | |
| ResNet-50 | 1 | 4 | - | - | | |
| ResNet-50* | 1 | 4 | 54.38% | 78.57% | 18.49% | 12.55% |
| ResNet-50 | 2 | 4 | 70.38% | 89.48% | 2.49% | 1.64% |
| ResNet-50* | 2 | 4 | 72.20% | 90.71% | 0.67% | 0.41% |
| ResNet-50 | 3 | 4 | 72.56% | 90.96% | 0.31% | 0.16% |
| ResNet-50* | 3 | 4 | 72.58% | 90.97% | 0.29% | 0.15% |

FIG. 11

| Network | Conventional # of Mult teraOps | shiftALU teraCycles | Speed-Up # of Cycles |
|---|---|---|---|
| SqueezeNet | 0.41 | 0.00158 | 260× |
| GoogleNet | 1.75 | 0.00255 | 687× |
| ResNet-18 | 1.97 | 0.0018 | 1090× |

FIG. 12

| ALU | LUT | FF | DSP | BRAM | Power, mW | Equiv. Power, mW for SqueezeNet v1.1 |
|---|---|---|---|---|---|---|
| Mult. DSP | 0 | 0 | 1 | 0 | 4 | 1165 |
| Mult. LUT | 76 | 32 | 0 | 0 | 3 | 780 |
| shiftALU | 164 | 18 | 0 | 8 | 60 | 60 |

# INFORMATION PROCESSING METHOD, INFORMATION PROCESSING APPARATUS, AND COMPUTER-READABLE RECORDING MEDIUM

BACKGROUND

1. Technical Field

The present disclosure relates to an information processing method, an information processing apparatus, and a computer-readable recording medium.

2. Description of the Related Art

In recent years, deep learning algorithms have yielded benefits in many fields of study including computer vision for, for example, image classification, object detection, and semantic segmentation for performing pixel-level recognition on images.

Among deep neural networks (DNNs) used for deep learning, convolutional neural networks (CNNs) have been most widely used. Arithmetic operations on CNNs have been executable by only graphics processing units (GPU) that consume large amounts of power.

However, it has been known that CNNs executed by GPUs are simple in operation but use floating point formats that are low in computational efficiency.

Accordingly, in order to realize CNN architectures that are low in computational cost and are high in power efficiency and to implement the CNN architectures in embedded systems that run at low power consumption, numerous studies and approaches to implementation have been made. One example is disclosed in Non-Patent Document 1: Philipp Gysel, Mohammad Motamedi, and Soheil Ghiasi. Hardware-oriented approximation of convolutional neural networks, arXiv preprint arXiv: 1604.03168, 2016.

Non-Patent Document 1 discloses a method in which quantized fixed points that are higher in computational efficiency than a floating point format are used as CNN data representations. Non-Patent Document 1 also discloses a technique for converting a floating point format into a fixed-point quantization format, which is one low-precision quantization representation, to perform a convolution operation.

SUMMARY

In one general aspect, the techniques disclosed here feature an information processing method including: inputting an input tensor indicating data to a processor having a memory; causing the processor to perform, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation; and outputting, as an output tensor, the elements of the input tensor on which the convolution operation processing is performed.

According to an information processing method, an information processing apparatus, and a computer-readable recording medium in the present disclosure, it is possible to improve the computational efficiency of a convolution operation, and it is possible to reduce the power consumption.

It should be noted that general or specific embodiments may be implemented as a system, a method, an integrated circuit, a computer program, a computer-readable storage medium, such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates a predetermined algorithm for converting a weight tensor that can be used for a convolution operation into the power-of-two format;

FIG. 7 illustrates one example of pseudocode stating the flow of processing in a control unit in the embodiment;

FIG. 8 is a flowchart illustrating computational processing in the information processing apparatus in the embodiment;

FIG. 10 is a table illustrating evaluation results obtained by evaluating accuracy rates by using an ImageNet dataset in a first example;

FIG. 11 is a table illustrating comparison of the number of multiplication operations needed in a convolution operation for typical convolutional layers for three CNN models in the first example and the number of cycles of shift operations needed for the convolution operation after conversion of the CNN modes into ShiftCNN; and FIG. 12 is a table illustrating comparison of estimated power when an FPGA in a second example is used.

DETAILED DESCRIPTION (Knowledge Underlying Present Disclosure)

Figure 1:
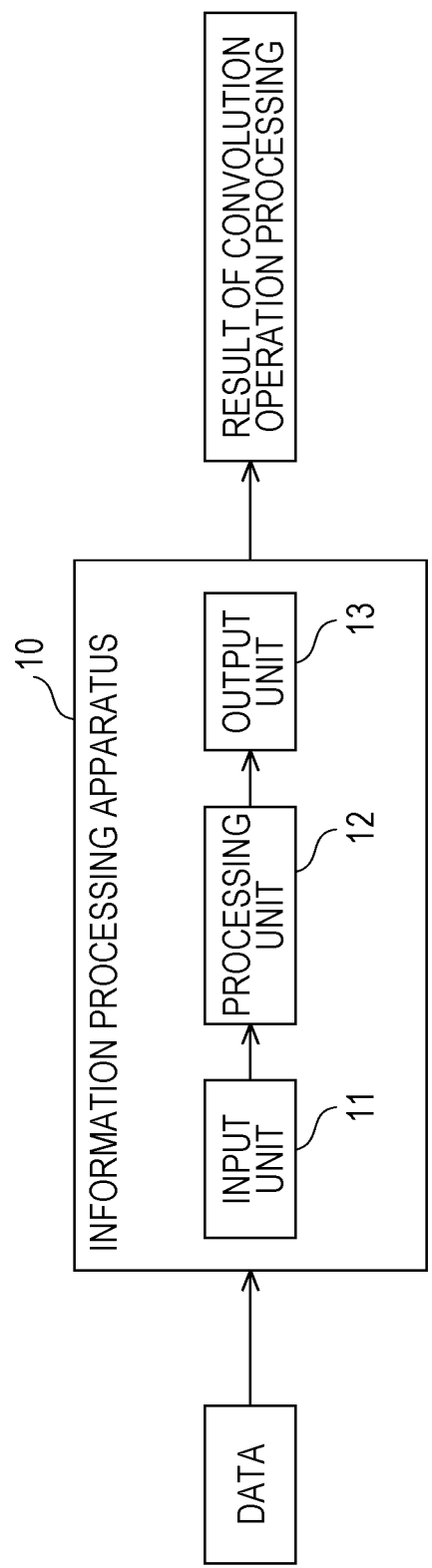
FIG. 1 is a block diagram illustrating one example of the configuration of an information processing apparatus in an embodiment.

Although the computational efficiency of a convolution operation can be improved with the technique disclosed in Non-Patent Document 1, the improvement is not high enough to enable the technique to be implemented in low-power consumption embedded systems, such as field programmable gate arrays (FPGAs) or application-specific integrated circuits (ASICs). Thus, it is necessary to further improve the computational efficiency of the convolution operation and to reduce the power consumption.

The present disclosure has been made in view of the foregoing situation and provides an information processing method, an information processing apparatus, and a computer-readable recording medium that can improve the computational efficiency of a convolution operation and that can reduce the power consumption.

An information processing method according to one aspect of the present disclosure includes: inputting an input tensor indicating data to a processor having a memory; causing the processor to perform, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation; and outputting, as an output tensor, the elements of the input tensor on which the convolution operation processing is performed.

This allows the convolution operation to be performed with only addition and shift operations without requiring a multiplication operation, thus making it possible to further improve the computational efficiency of the convolution operation and making it possible to reduce the power consumption.

For example, the processor may be caused to perform the precomputation and to store the precomputed elements of the input tensor in the memory.

For example, during the convolution operation processing, the processor may be caused to perform an arithmetic operation on a convolutional layer included in a convolutional neural network.

This makes it possible to further improve the computational efficiency of a convolution operation performed on a convolutional layer in a CNN and makes it possible to reduce the power consumption of an apparatus in which the CNN is implemented.

For example, the weight tensors may be constituted by $2^B-1$ combinations, where B represents a bit value of two's complement and is an integer greater than or equal to 1, and may be stored in the memory as a codebook; and a weight tensor element identified with B and N, where N is a dimension number indicating a degree of freedom of a one-bit representation and is an integer greater than or equal to 1, may be obtained from the codebook and may be used for the convolution operation processing.

Thus, since the weights used for performing the convolution operation can be pre-held as a codebook like a dictionary, it is possible to further improve the computational efficiency of the convolution operation.

Also, for example, N may be an integer greater than or equal to 2.

Thus, the convolution operation can be performed with only addition and shift operations in the range of less than 1% of an accuracy rate decrease or accuracy drop.

An information processing apparatus according to the present disclosure includes: an inputter that inputs an input tensor indicating data; a processor that has a memory and that performs, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation; and an outputter that outputs, as an output tensor, the elements of the input tensor on which the convolution operation processing is performed.

It should be noted that general or specific embodiments may be implemented as a system, a method, an integrated circuit, a computer program, a computer-readable storage medium, such as a CD-ROM, or any selective combination thereof.

The embodiment described below represents a specific example in the present disclosure. Numerical values, shapes, constituent elements, steps, the order of steps, and so on described in the embodiment below are examples and are not intended to limit the present disclosure. Also, of the constituent elements in the embodiment below, constituent elements not set forth in the independent claims that represent the broadest concept will be described as optional constituent elements. In the embodiment, particulars described therein may also be combined together combination.

EMBODIMENT

An information processing method and so on for an information processing apparatus 10 in an embodiment will be described below with reference to the accompanying drawings.

[Configuration of Information Processing Apparatus 10]

FIG. 1 is a block diagram illustrating one example of the configuration of the information processing apparatus 10 in the embodiment.

The information processing apparatus 10 may be realized by a computer or the like using a convolutional neural network. The information processing apparatus 10 includes an input unit 11, a processing unit 12, and an output unit 13, as illustrated in FIG. 1. In the information processing apparatus 10, when the input unit 11 inputs data to be processed, such as an image or a moving image, the processing unit 12 performs convolution operation processing, and the output unit 13 outputs a convolution operation processing result, which is a result of the processing. The data to be processed is not limited to an image or a moving image.

[Input Unit 11]

The input unit 11 inputs an input tensor indicating data to be processed to the processing unit 12. Herein, the data to be processed is an image or a moving image, but is not limited thereto. When the processing unit 12 performs arithmetic operations on one convolutional layer, the data may be a result of convolution operation processing on, for example, a convolutional layer prior to that convolutional layer.

[Processing Unit 12]

The processing unit 12 includes, for example, a memory 124. The processing unit 12, for example, performs various types of processing. Specific details of the above-described processing are described below. The processing unit 121 corresponds to, for example, a processor having a memory. After elements of the input tensor are subjected to precomputation for conversion into a power-of-two format and are stored in the memory 124, the processing unit 12 performs convolution operation processing with only addition and shift operations by using the precomputed elements of the input tensor stored in the memory 124 and weight tensors that are pre-converted into the power-of-two format in accordance with a predetermined algorithm, that are stored in the memory 124, and that indicate weights having a possibility of being used for a convolution operation. In this case, the processing unit 12 may precompute the elements of the input tensor and store the precomputed elements in the memory 124. Also, the weight tensors may be constituted by $2^B-1$ combinations, where B (an integer greater than or equal to 1) represents a bit value of two's complement, and may be stored in the memory 124 as a codebook. The processing unit 12 obtains, from a codebook 123, a weight tensor element identified with B mentioned above and N (an integer greater than or equal to 1), which is a dimension number indicating the degree of freedom of a 1-bit representation, and uses the obtained weight tensor element for the convolution operation processing. N may be an integer greater than or equal to 2.

Specifically, the processing unit 12 converts a CNN data representation into a power-of-two format, which is high in hardware efficiency, and executes a convolution operation without multiplication. In other words, the processing unit 12 can also be said to be a CNN architecture, also called a ShiftCNN, with which the convolution operation can be executed without multiplication. The processing unit 12 is not limited to a case in which it performs arithmetic operations for convolutional layers included in a CNN and may merely perform the convolution operation.

Although details of the configuration of the processing unit 12 will be described below with reference to the accompanying drawings for ease of description, the processing unit 12 will be described as performing arithmetic operations on one of convolutional layers included in a CNN.

Figure 2:
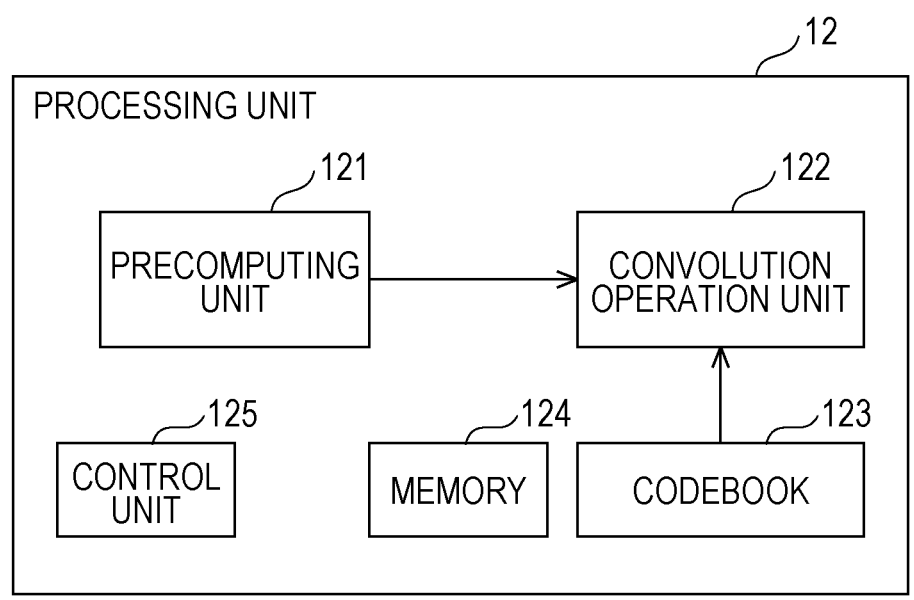
FIG. 2 is a block diagram illustrating one example of details of the configuration of a processing unit illustrated in FIG. 1.
Figure 3:
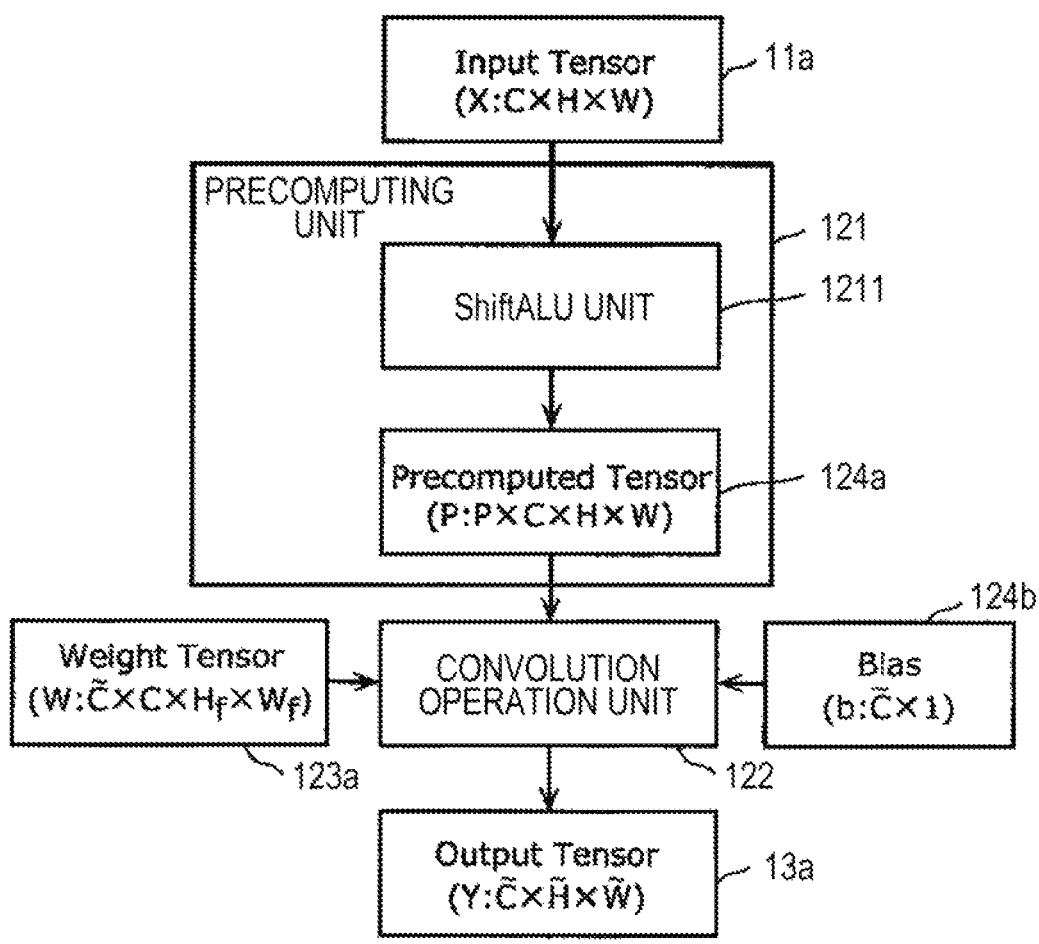
FIG. 3 is a diagram conceptually illustrating convolution operation processing performed by the processing unit illustrated in FIG. 1.

FIG. 2 is a block diagram illustrating one example of details of the configuration of the processing unit 12 illustrated in FIG. 1. FIG. 3 is a diagram conceptually illustrating convolution operation processing performed by the processing unit 12 illustrated in FIG. 1.

In the present embodiment, the processing unit 12 includes a precomputing unit 121, a convolution operation unit 122, the codebook 123, the memory 124, and a control unit 125, as illustrated in FIG. 2. The processing unit 12 does not necessarily have to include the precomputing unit 121.

First, a description will be given of typical arithmetic operations, that is, a convolution operation, for a CNN convolutional layer.

<Convolution Operation>

An input to each convolutional layer in a typical CNN can be represented by an input tensor X. The input tensor X is an element of a set R expressed in:

$$X \in R^{C \times H \times W} \quad (1)$$

where C is the number of input channels, H is a height, and W is a width.

The input tensor X is then convolved with a weight tensor W. The weight tensor W is an element of a set R expressed in:

$$X \in R^{\tilde{C} \times H_f \times W_f} \quad (2).$$

In expression (2), the number of output channels is $\tilde{C}$, the height of a filter kernel is $H_f$, and the width of the filter kernel is $W_f$.

A bias term b indicated by a bias vector is added to the result of the convolution operation. The bias term b is an element of a set R expressed in:

$$b \in R^{\tilde{C}} \quad (3).$$

An output tensor Y when the number of channels is $\tilde{C}$ can be determined using a calculation expression given by:

$$Y_{\tilde{C}} = W_{\tilde{C}} * X + b_{\tilde{C}} \quad (4)$$

where * represents a convolution operation.

The output tensor Y is an element of a set R expressed in:

$$Y \in R^{\tilde{C} \times \tilde{H} \times \tilde{W}} \quad (5).$$

Next, constituent elements included in the processing unit 12 will be described with reference to FIGS. 2, 3, and so on.

<Memory 124>

The memory 124 is implemented by a hard disk, a semiconductor memory, or the like, and information is stored therein.

In the present embodiment, a result of precomputation performed by the precomputing unit 121 and a result of convolution operation processing performed by the convolution operation unit 122 may be stored in the memory 124. The value of the bias term that the convolution operation unit 122 uses during the convolution operation processing may be stored in the memory 124. The codebook 123, described below, may also be stored in the memory 124.

<Precomputing Unit 121>

The precomputing unit 121 performs precomputation for converting the elements of the input tensor X into a power-of-two format. The precomputing unit 121 performs the precomputation and stores, in the memory 124, the elements of the input tensor X on which the precomputation has been performed.

In the present embodiment, the precomputing unit 121 includes a ShiftALU unit 1211, as illustrated in FIG. 3. Before the convolution operation unit 122 performs a convolution operation, the precomputing unit 121 uses the ShiftALU unit 1211 to convert the elements of an input tensor X, for example, represented by 11a, into a tensor P in a power-of-two format. The tensor P is represented by, for example, 124a in FIG. 3 and is constituted by all possible combinations for each element of the input tensor X. The tensor P is constituted by (M+2(N−1)) combinations, where B (an integer greater than or equal to 1) is a bit value of two's complement, and N (an integer greater than or equal to 1) is a dimension number indicating the degree of freedom of a 1-bit representation. The tensor P corresponds to a tensor obtained by converting the input tensor X into a representation format on which a shift operation can be performed.

<ShiftALU Unit 1211>

Figure 4:
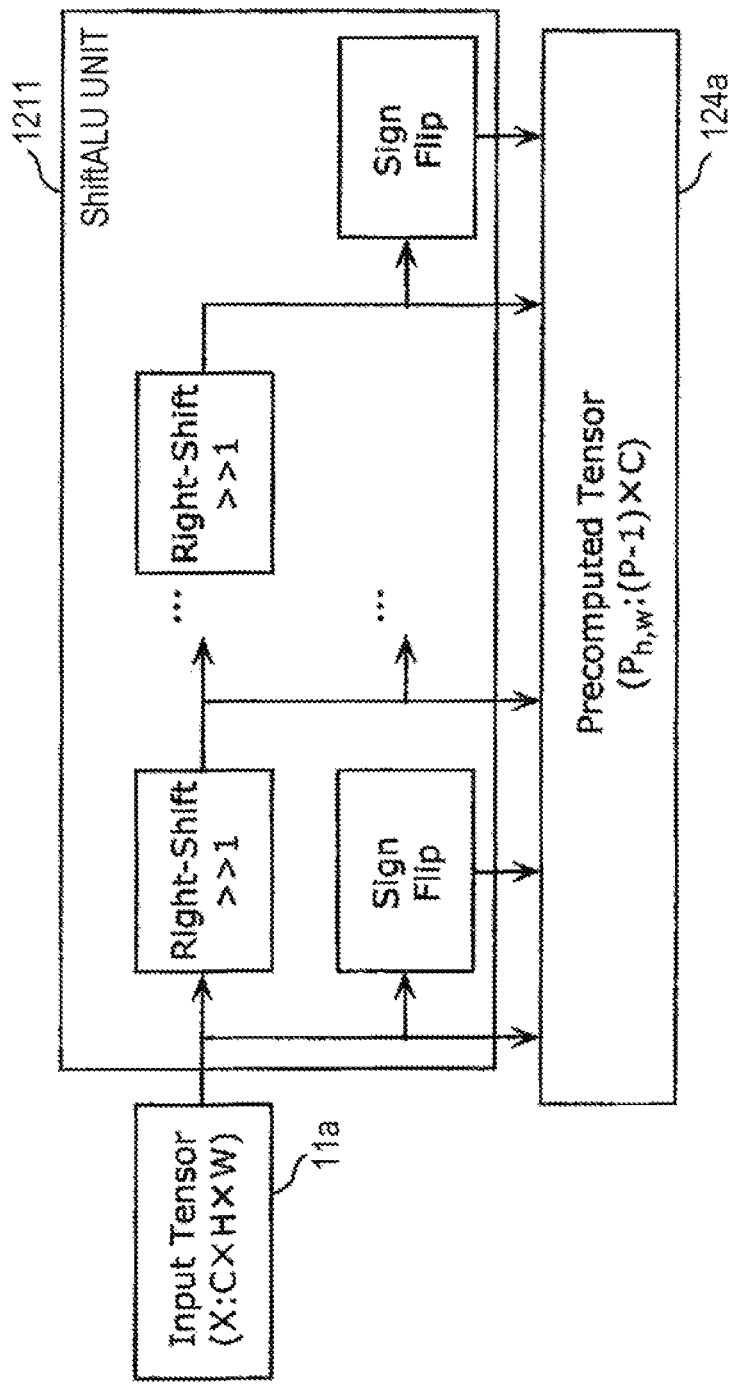
FIG. 4 is a diagram conceptually illustrating details of the configuration of a ShiftALU unit illustrated in FIG. 3.

FIG. 4 is a diagram conceptually illustrating details of the configuration of the ShiftALU unit 1211 illustrated in FIG. 3.

The ShiftALU unit 1211 is a special shift arithmetic logic unit, also called a shift arithmetic unit, and includes a plurality of shifters and a plurality of flips that performs sign flipping. The plurality of shifters and the plurality of flips may be realized by logic circuitry or may be realized by program logic. As illustrated in FIG. 4, each of the shifters performs an arithmetic operation for shifting the input tensor X, which represents input values, to the right one-by-one and stores the resulting values in the memory 124. Each of the flips performs sign flipping on the value resulting from the arithmetic operation performed by the corresponding shifter to shift the value to the right and stores the resulting value in the memory 124. The ShiftALU unit 1211 executes 1-bit shifting a total of 1/P times. Thus, the tensor P can be precomputed and be stored in the memory 124.

The precomputing unit 121 may or may not be included in the processing unit 12, as described above. In this case, it is sufficient that the precomputing unit 121 is provided external to the processing unit 12, and the tensor P, which is a result of the precomputation performed by the precomputing unit 121, is stored in the memory 124. Also, when the ShiftALU unit 1211 is realized by program logic, the ShiftALU unit 1211 may use a predetermined algorithm, described below and illustrated in FIG. 5, to perform precomputation for converting the input tensor X into the tensor P.

<Codebook 123>

FIG. 5 illustrates a predetermined algorithm for converting a weight tensor that can be used for a convolution operation into a power-of-two format. In FIG. 5, the predetermined algorithm is denoted as "Algorithm 1".

The codebook 123 may be stored in the memory 124 or may be stored in a memory different from the memory 124. In the present embodiment, the codebook 123 will be described as being stored in a memory different from the memory 124.

The codebook 123 stores therein a combination of weight tensors W that are pre-converted into a power-of-two format in accordance with a predetermined algorithm and that indicate weights having a possibility of being used for a convolution operation. In other words, the weight tensors W are constituted by $2^B-1$ combinations, where B (an integer greater than or equal to 1) is a bit value of two's complement, and are stored in the memory as the codebook 123. An element of the weight tensors W is identified in the codebook 123 by using B and a dimension number N (an integer greater than or equal to 1) indicating the degree of freedom of a 1-bit representation. N may be an integer greater than or equal to 2. In other words, the codebook 123 is like a dictionary of weight tensors with which addresses or indices identified by B and N are associated.

In the present embodiment, the weight tensors W are approximated with low-precision weight tensors $\hat{W}$ and are stored in the codebook 123. Approximating the weight tensors W with the low-precision weight tensors $\hat{W}$ makes it possible to provide weights with $2^B-1$ combinations converted into the power-of-two format, thus making it possible to pre-store the weight tensors W in a tabular form, that is, in the codebook 123.

Elements $$\hat{w}_i (i \in \{\tilde{c}, c, h_f, w_f\})$$

of the low-precision weight tensors $\hat{W}$ are given by:

$$\hat{w}_i = \sum_{n=0}^{N-1} C_n[idx_i(n)] \qquad (6)$$

and are stored in the codebook 123.

In expression (6), Cn is given by:

$$C_n = \{0, \pm 2^{-n}, +2^{-n-1}, \pm 2^{-n-2}, \ldots, \pm 2^{-n-[M/2]+1}\}$$

That is, Cn indicates addresses or indices in the codebook 123.

In the present embodiment, the elements $\hat{w}_i$ of the low-precision weight tensors $\hat{W}$ are normalized with MAX(abs(W)) by using a predetermined algorithm, that is, Algorithm 1 illustrated in FIG. 5, are converted, and are stored in the codebook 123.

In FIG. 5, in the second line, the value of each element $\hat{w}_i$ for the maximum value of a weight tensor is set to an input value r, and Algorithm 1 in the third and subsequent lines is executed with a value of 0 to 1.

In the fourth line, the sign of the input value r in the second line is calculated as $q_{sgn}$, and in the fifth line, the logarithm of the input value r in the second line to the base 2 is calculated as $q_{log}$. Also, in the seventh line to ninth lines, $\log_2 1.5$ indicating a quantization border is used to determine whether the number of digits of the value of $q_{log}$ is, for example, increased by one through rounding or is kept. In the 10th to 16th lines, the number of digits is recursively quantized, that is, is converted into the power-of-two format N times.

<Convolution Operation Unit 122>

After the precomputation is performed, the convolution operation unit 122 performs convolution operation processing with only addition and shift operations by using the precomputed elements of the input tensor stored in the memory 124 and weight tensors that are pre-converted into a power-of-two format in accordance with a predetermined algorithm and that indicate weights having a possibility of being used for a convolution operation.

For example, as conceptually illustrated in FIG. 3, the convolution operation unit 122 performs convolution operation processing with only addition and shift operations by using a precomputed tensor 124a, a weight tensor 123a, and a bias term 124b. The precomputed tensor 124a is each element of the input tensor on which the ShiftALU unit 1211 in the precomputing unit 121 performed precomputation. The weight tensor 123a is a weight tensor obtained from low-precision weigh tensors that are pre-converted into a power-of-two format in accordance with Algorithm 1 illustrated in FIG. 5, that are stored in the codebook 123, and that indicate weights having a possibility of being used for a convolution operation.

Figure 6:
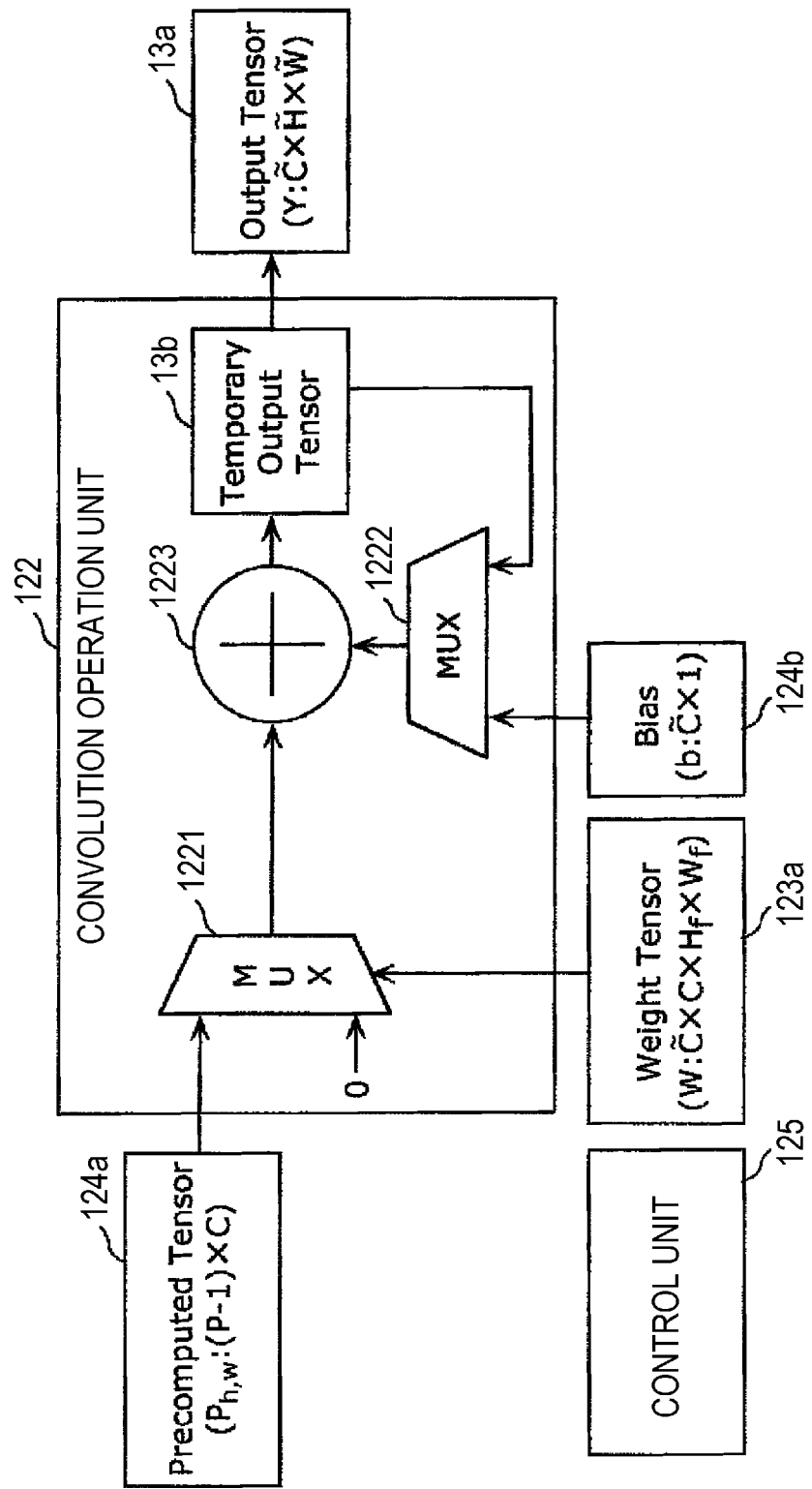
FIG. 6 conceptually illustrates details of the configuration of a convolution operation unit illustrated in FIG. 2.

FIG. 6 conceptually illustrates details of the configuration of the convolution operation unit 122 illustrated in FIG. 2.

In the present embodiment, the convolution operation unit 122 includes multiplexers 1221 and 1222 and an adder 1223, as illustrated in FIG. 6.

The multiplexer 1221 fetches (obtains) the precomputed tensor 124a from the memory 124 in accordance with the address or index of the weight tensor 123a, performs a convolution operation between the weight tensor 123a and the precomputed tensor 124a by using a shift operation, and outputs a result to the adder 1223. More specifically, the multiplexer 1221 selects a value indicating zero (value 0) or the digit of a power of two as the value of an element of the weight tensor 123a and outputs, to the adder 1223, a result of a shift operation on a value indicating the digit of a power of two, the value representing a value of an element of the precomputed tensor 124a, and a value indicating the value of a power of two, the value representing the value of the element of the weight tensor 123a.

The adder 1223 calculates a temporary output tensor 13b by adding the value output by the multiplexer 1221 and the bias term 124b. When the adder 1223 has previously calculated the temporary output tensor 13b, the adder 1223 adds a value, obtained by adding the bias term 124b and the previously calculated temporary output tensor 13b, to the value output by the multiplexer 1221, to thereby update the temporary output tensor 13b. The adder 1223 then outputs the temporary output tensor 13b updated N−1 times to the output unit 13 as an output tensor 13a. As described above, the temporary output tensor 13b is updated N−1 times and is output to the output unit 13 as the output tensor 13a.

The multiplexer 1222 outputs a value, obtained by the adder 1223 multiplexing the bias term 124b and the previously calculated or updated temporary output tensor 13b, to the adder 1223. When there is no temporary output tensor 13b previously calculated or updated by the adder 1223, the multiplexer 1222 outputs only the bias term 124b to the adder 1223.

<Control Unit 125>

The control unit 125 controls the precomputing unit 121 and the convolution operation unit 122.

It is easy for the control unit 125 to cause the precomputing unit 121 to calculate the precomputed tensor 124a by using the ShiftALU unit 1211. Meanwhile, in order for the control unit 125 to cause the convolution operation unit 122 to perform a convolution operation with only shift and addition operations, all possible filter kernels need to be supported, and complex scheduling and control logic are needed.

FIG. 7 illustrates one example of pseudocode stating the flow of processing in the control unit 125 in the embodiment. In FIG. 7, the pseudocode is denoted as algorithm 2.

In FIG. 7, the second line states that an input vector x is to be read as the input tensor X. The third line states that the precomputing unit 121 performs precomputation and stores the result thereof in the memory 124.

The fourth line states that calculations in the fifth to ninth lines are to be repeatedly performed a number of times corresponding to the number of output channels. The fifth line states that after the calculations in the sixth to ninth lines, an addition operation is performed on the bias term.

The sixth to eighth lines state that the convolution operation unit 122 is made to perform a convolution operation on the height and the width of all potential filter kernels a number of times corresponding to N of elements of precomputed P. The ninth line states that the convolution operation unit 122 is made to add the value resulting from the convolution operation to an output tensor.

In the present embodiment, for example, in accordance with the pseudocode illustrated in FIG. 7, the control unit 125 controls the precomputing unit 121 and the convolution operation unit 122 to perform precomputation and the convolution operation.

[Output Unit 13]

The output unit 13 outputs, as an output tensor, the elements of the input tensor on which the processing unit 12 performed the convolution operation processing.

In the present embodiment, the output unit 13 outputs the output tensor 13a output from the convolution operation unit 122 as a result of the convolution operation processing performed on one convolutional layer included in the CNN.

[Operation of Information Processing Apparatus 10]

Next, a description will be given of the operation of the information processing apparatus 10 configured as described above.

FIG. 8 is a flowchart illustrating computational processing in the information processing apparatus 10 in the embodiment.

First, the information processing apparatus 10 performs input processing for inputting an input tensor indicating data to be processed to the processing unit 12 (S1). More specifically, the information processing apparatus 10 causes the input unit 11 illustrated in FIG. 1 to input an input tensor indicating data to be processed to the processing unit 12.

Next, the information processing apparatus 10 performs precomputation for converting the input tensor into the power-of-two format (S2). More specifically, the information processing apparatus 10 causes the precomputing unit 121 in the processing unit 12 to perform precomputation for converting the elements of the input tensor into the power-of-two format and to store the resulting input tensor in the memory 124.

Next, by using the input tensor precomputed in step S2, the information processing apparatus 10 performs convolution operation processing with only addition and shift operations (S3). More specifically, the information processing apparatus 10 causes the convolution operation unit 122 in the processing unit 12 to perform, after the precomputation, convolution operation processing with only addition and shift operations by using the precomputed elements of the input tensor stored in the memory 124 and weight tensors that are pre-converted into a power-of-two format in accordance with a predetermined algorithm, that are stored in the codebook 123, and that indicate weights having a possibility of being used for a convolution operation.

Next, the information processing apparatus 10 outputs, as an output tensor, the input tensor on which the convolution operation processing was performed in step S3 (S4). More specifically, the information processing apparatus 10 causes the output unit 13 to output, as an output tensor, the elements of the input tensor on which the processing unit 12 performed the convolution operation processing in step S3.

Figure 9:
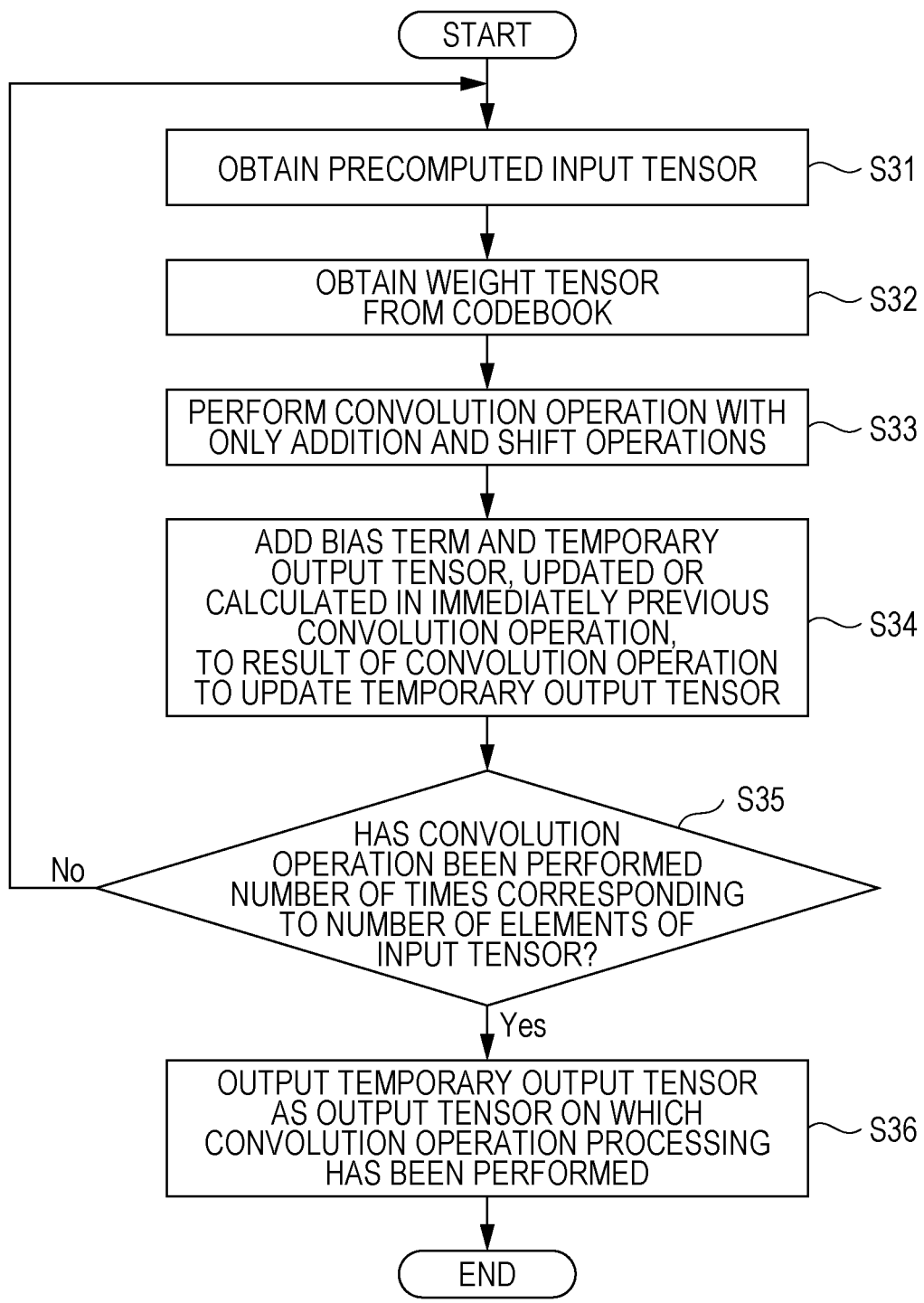
FIG. 9 is a flowchart illustrating details of convolution operation processing in step S3 illustrated in FIG. 8.

FIG. 9 is a flowchart illustrating details of the convolution operation processing in step S3 illustrated in FIG. 8.

In step S3, first, the information processing apparatus 10 causes the convolution operation unit 122 to obtain the input tensor precomputed in step S2 (S31).

Next, the information processing apparatus 10 causes the convolution operation unit 122 to obtain a weight tensor from the codebook 123 (S32). Weight tensors stored in the codebook 123 include weights that are pre-converted into the power-of-two format in accordance with Algorithm 1 and that have a possibility of being used for the convolution operation. In the present embodiment, the weight tensors stored in the codebook 123 have been converted into low-precision weight tensors in the power-of-two format. By referring to the codebook 123 and using an address or an index, the convolution operation unit 122 can obtain a weight tensor needed for convolution operation on the elements of the precomputed input tensor.

Next, the information processing apparatus 10 causes the convolution operation unit 122 to perform convolution operation with only addition and shift operations by using the weight tensor obtained in step S32 and the precomputed input tensor obtained in step S31 (S33).

Next, the information processing apparatus 10 causes the convolution operation unit 122 to add a bias term and a temporary output tensor, updated or calculated in an immediately previous convolution operation, to the result of the convolution operation performed in step S33, to thereby update the temporary output tensor (S34).

Next, the information processing apparatus 10 determines whether or not the convolution operation unit 122 has performed the convolution operation a number of times corresponding to the number of elements of the precomputed input tensor obtained in step S31 (S35). When the convolution operation has been performed a number of times corresponding to the number of elements of the precomputed input tensor (Yes in S35), the information processing apparatus 10 causes the output unit 13 to output a temporary output tensor as an output tensor on which the convolution operation processing has been performed (S36).

On the other hand, when the convolution operation has not been performed a number of times corresponding to the number of elements of the precomputed input tensor (No in S35), the information processing apparatus 10 causes the convolution operation unit 122 to perform the process in steps S31 again.

[Advantages, Etc.]

As described above, according to the information processing apparatus 10 in the present embodiment, the convolution operation can be performed with only the addition and shift operations without requiring a multiplication operation. Thus, it is possible to further improve the computational efficiency of the convolution operation, and it is possible to reduce the power consumption. More specifically, according to the information processing apparatus 10 in the present embodiment, the power-of-two format, which is high in hardware efficiency, is employed for CNN data representations, thereby making it possible to perform a convolution operation with only shift and addition operations and without multiplication. This makes it possible to significantly reduce the computational cost of the convolutional layers, which are portions where the amount of computation is the largest in the CNN. Hence, it is possible to further improve the computational efficiency of the convolution operation performed on a convolutional layer in a CNN, and it is possible to reduce the power consumption of an apparatus in which the CNN is implemented.

Also, the information processing apparatus 10 in the present embodiment performs a convolution operation by using the codebook 123 in which weights having a possibility of being used for the convolution operation, the weights being pre-converted into a power-of-two format, are stored as weights with which addresses or indices are associated. Since the weights stored in the codebook 123 are weights with $2^B-1$ combinations, where B (an integer greater than or equal to 1) is a bit value of two's complement, and have been converted into the power-of-two format, the size of the codebook 123 is relatively small. Since the weights used for performing the convolution operation can be pre-held as the codebook like a dictionary, as described above, it is possible to precompute the convolution term in the convolution operation. Since the computational cost of the convolution operation can be reduced, for example, the number of arithmetic operations needed for the convolution operation for convolutional layers in a typical CNN model can be reduced to $\frac{1}{100}$, that is, can be reduced by at least two orders of magnitude, thus making it possible to improve the computational efficiency of the convolution operation.

More specifically, the information processing apparatus 10 in the present embodiment has three features below. First, the weight tensors W having a possibility of being used for the convolution operation are approximated with low-precision weight tensors
$\hat{W}$
to thereby make it possible to prepare the weight tensors with $M=2^B-1$ combinations in the codebook 123, the weight tensors being converted into the power-of-two format. Second, with respect to all combinations of each element of the input tensor X, the tensor P in a power-of-two format is precomputed. The precomputation of the tensor P is performed using the ShiftALU unit 1211, which is a special shift arithmetic logic unit, or Algorithm 1. Third, the elements of the weight tensor
$\hat{W}$
selected according to an address or an index and the elements of the precomputed tensor P are subjected to a convolution operation using only shift and addition operations, and the resulting elements are accumulated, thereby performing convolution operation processing.

As described above, the information processing apparatus 10 in the present embodiment can significantly reduce the computational cost of convolutional layers, which are largest in the amount of computation, in a CNN.

The information processing apparatus 10 in the present embodiment can also be expressed as converting a typical CNN model into a ShiftCNN model in which weight tensors were converted into power-of-two representations with which the convolution operation can be performed without multiplication, by using the ShiftALU unit 1211 or Algorithm 1. In the ShiftCNN model, re-training of a CNN is not necessary, and the convolution operation in convolutional layers in a typical CNN model can be performed without an accuracy drop by using only shift and addition operations.

Now, for simplicity, assume, for a filter kernel with a stride of 1, the heights of the output channel and the input channel are the same, and the widths thereof are the same, that is, $$\tilde{H}=H, \tilde{W}=W.$$

In this case, in a convolutional layer in a typical CNN, multiplication given by $$(\tilde{C}CHWH_f w_f)$$

is executed to perform a convolution operation. Meanwhile, the information processing apparatus 10 in the present embodiment executes only (PCHW) arithmetic operations as a convolution operation for a convolutional layer.

Also, since $$P<<(\tilde{C}H_f w_f)$$

is given, the computational cost reduction in terms of the number of arithmetic operations can be quantified by a ratio thereof, specifically:

$$(\tilde{C}H_f w_f)/P.$$

That is, when all multiplication operations are replaced with shift operations using power-of-two representations, the number of arithmetic operations for each convolutional layer included in the CNN can be reduced by:

$$(\tilde{C}H_f w_f)/P.$$

The ShiftALU unit 1211 performs (P−1) arithmetic operations by performing bit-by-bit right-shift processing and sign-flipping processing [P/2] times. That is, the ShiftALU unit 1211 can further reduce the number of cycles needed to generate the precomputed tensor P by a factor of P.

First Example

Since extensive evaluation on the effectiveness of ShiftCNN, which corresponds to the processing unit 12 in the information processing apparatus 10, was performed using a large number of images and an ImageNet dataset constituted by tags indicating the content thereof, the evaluation result thereof will be described as a first example.

<Evaluation Subjects>

In this example, GoogleNet, ResNet, and SqueezeNet, which are typical CNN models used for image classification, were selected as typical CNNs converted into ShiftCNN models.

GoogleNet and ResNet-50, which are subsets of pre-trained models, were downloaded from Caffe, which is an open-source deep learning library. SqueezeNet v1.1 and ResNet-18 were download from publicly available sources through the Internet. All these CNN models were pre-trained on an ImageNet dataset by their authors.

<Evaluation Condition>

All these CNN models were converted into ShiftCNN models by performing emulation in the power-of-two format by reducing floating-point precision in accordance with Algorithm 1 illustrated in FIG. 5. Then, 50,000 images cropped from the ImageNet dataset for verification and centered with the aspect ratio being maintained were used to evaluate top-1 and top-5 accuracies by using Caffe tools.

The top-1 accuracy means, in a task for identifying what types of image input images are, accuracy rates of complete matches of a first candidate, that is, a top candidate, in identification results with correct answers. The top-5 accuracy means, in the task for identifying what types of image the input images are, accuracy rates of complete matches with correct answers, the complete matches being included in the top five images in the identification results.

<Evaluation Results>

FIG. 10 is a table illustrating evaluation results obtained by evaluating accuracy rates by using the ImageNet dataset in the first example. FIG. 10 illustrates results of evaluation of top-1 and top-5 accuracies by using the ImageNet dataset after converting SqueezeNet, GoogleNet, ResNet-18, and ResNet-50 into ShiftCNN models.

In FIG. 10, a SqueezeNet base, a GoogleNet base, a ResNet-18 base, and a ResNet-50 base are original CNN models that have not been converted into ShiftCNN models. ResNet models marked with "*" represent ShiftCNN models in which only convolutional layers in a ResNet model was converted into a power-of-two representation. B represents a bit width and corresponds to the bit value of the aforementioned two's complement. N corresponds to a dimension number indicating the degree of freedom of a 1-bit representation and is denoted as "Shifts" in FIG. 10.

FIG. 10 shows that the CNN models converted into the ShiftCNN models have less than 0.29% of an accuracy rate reduction or an accuracy drop for B=4 and N>2. Also, the CNN models converted into the ShiftCNN models also exhibit a 1% accuracy rate reduction or accuracy drop for B=4 and N=2. Thus, it is thought that there is a tradeoff relationship between the accuracy rate and computational complexity.

The CNN models converted into the ShiftCNN models do not show any significant accuracy improvements for B>4. FIG. 10 suggests that the CNN models converted into the ShiftCNN models do not significantly function for N=1 and need re-training, thus requiring a number of addition operations which is the same as that for the typical convolutional layers.

The above evaluation results show that, for B=4 and N>2, the CNN models converted into the ShiftCNN models can obtain accuracy rates that are equivalent to those in the original CNN models without performing re-training.

That is, it is found that converting CNN models into ShiftCNN models having data representations in the power-of-two format in accordance with Algorithm 1 illustrated in FIG. 5 makes it possible to perform a convolution operation in a range of less than 1% of an accuracy rate decrease or an accuracy drop.

Accordingly, it is found that the information processing apparatus 10 in the present disclosure can perform a convolution operation with only addition and shift operations in the range of less than 1% of an accuracy rate decrease or an accuracy drop.

FIG. 11 is a table illustrating comparison of the number of multiplication operations needed in a convolution operation for typical convolutional layers for three CNN models in the first example and the number of cycles of shift operations needed for the convolution operation after conversion of the CNN modes into ShiftCNN. The speed-up illustrated in FIG. 11 is evaluated by dividing the number of shift operations by the number of multiplication operations needed for the convolution operation for the typical convolutional layers.

It can be seen from FIG. 11 that SqueezeNet achieves only a 260× speed-up since it does not use a filter kernel with HfWf>3. It can also be seen that GoogleNet and ResNet-18 achieve speed-ups of about three orders or magnitude since they use filter kernels with sizes of 7 and 5, respectively.

Accordingly, FIG. 11 shows that converting a typical CNN model into the ShiftCNN model can reduce the number of arithmetic operations by two orders of magnitude or more.

Second Example

In a second example, the ShiftALU unit 1211 illustrated in FIG. 4 and an arithmetic multiplier, which performed 8-bit multiplication operations and which is a comparative example, were designed using a register-transfer level (RTL), and results were compiled for a Xilinx Zynq XA7Z010 device. The Xilinx Zynq XA7Z010 device is an automotive-grade FPGA that operates at a 200 MHz clock rate. The bit width of the input tensor is 8 bits, and the ShiftALU unit 1211 and the arithmetic multiplier output 16-bit results. B representing the bit width used by the ShiftALU unit 1211 is 4 bits, and the convolutional-layer depth C is 512.

FIG. 12 is a table illustrating comparison of estimated power when the FPGA in the second example is used.

FIG. 12 illustrates, for comparison, an arithmetic multiplier (Mult. UT) implemented using only lookup tables (LUTs) without using digital signal processing (DSP) blocks and an arithmetic multiplier (Mult. DSP) implemented using DSP blocks without using LUTs, in addition to the ShiftALU unit 1211. Also, FIG. 12 illustrates the number of LUTs, the number of flip-flops (FFs), and the number of DSP blocks, the number of 36 KB block random-access memory (BRAMs), dynamic power, and power consumption.

It can be seen from FIG. 12 that 85% of dynamic power of the ShiftALU unit 1211 is consumed by the BRAM memories.

Also, FIG. 12 shows "Equiv. Power" indicating equivalent power needed to provide the same calculation speed. "Equiv. Power" was calculated by writing RTL code and executing power simulation.

It can be seen from FIG. 12 that the power consumption of the ShiftALU unit 1211 during convolution operation for convolutional layers is reduced to one-tenth, compared with the arithmetic multiplier (Mult. LUT). This result can also be seen from the fact that the computational cost significantly decreases since the complexity of the addition operations is O(B) while the complexity of the multiplication operations is $O(B^2)$.

Therefore, it is found that, according to the second example, the power consumption for the convolutional layers in a ShiftCNN model implemented on an FPGA chip can be reduced to about one-tenth. This shows that converting a known CNN model into a ShiftCNN model can achieve an implementation on an FPGA or ASIC chip.

As described above, the information processing apparatus and the information processing method according to the present disclosure make it possible to further improve the computational efficiency of the convolution operation and make it possible to reduce the power consumption. Accordingly, the information processing apparatus and the information processing method according to present disclosure can be applied not only to low-consumption embedded systems, such as implementations on FPGAs or ASICs, but also to DNN applications.

Feasibility of Other Illustrative Embodiments

Although the information processing apparatus and the information processing method in the present disclosure have been described above in the embodiment, the main body and the apparatus in which the individual processes are executed are not particularly limiting. The processes may also be executed by a processor (described below) incorporated into a particular apparatus provided locally. Also, the processes may be executed by a cloud server or the like provided at a place different from the place of the local apparatus.

The present disclosure is not limited to the above-described embodiment. For example, another embodiment realized by arbitrarily combining the constituent elements described hereinabove or by excluding some of the constituent elements may also be regarded as an embodiment of the present disclosure. The present disclosure also encompasses variations obtained by making various modifications conceived by those skilled in the art within a scope not departing from the spirit of the present disclosure, that is, not departing from the gist of the wording recited in the claims, to the embodiment described above.

The present disclosure further encompasses cases as described below.

(1) The above-described apparatus is, specifically, a computer system including a microprocessor, a read-only memory (ROM), a random-access memory (RAM), a hard disk unit, a display unit, a keyboard, a mouse, and so on. A computer program is stored in the RAM or the hard disk unit. The microprocessor operates in accordance with the computer program, so that the apparatus realizes its functions. The computer program in this case is a combination of a plurality of instruction codes for giving instructions to a computer in order to achieve a predetermined function.

(2) Some or all of the constituent elements included in the apparatus described above may be implemented by a single system large-scale integration (LSI) circuit. The system LSI is a super-multifunctional LSI circuit manufactured by integrating a plurality of constituent portions on one chip and is, specifically, a computer system including a microprocessor, a ROM, a RAM, and so on. The computer program is stored in the RAM. The microprocessor operates in accordance with the computer program, so that the system LSI realizes its functions.

(3) Some or all of the constituent elements included in the above-described apparatus may be implemented by an integrated circuit (IC) card or a single module that can be inserted into and removed from the apparatus. The IC card or the module may be a computer system including a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(4) The present disclosure may also be implemented by the methods described above. Those methods may also be realized by a computer program implemented by a computer or may be realized using digital signals provided by the computer program.

(5) In the present disclosure, the computer program or the digital signals may be recorded on computer-readable recording media, for example, a flexible disk, a hard disk, a CD-ROM, a magneto-optical (MO) disk, a digital versatile disk (DVD), a DVD-ROM, a DVD-RAM, a Blu-ray® Disc (BD), and a semiconductor memory. The present disclosure may also be realized by the digital signals recorded on the recording media.

Additionally, in the present disclosure, the computer program or the digital signals may be transmitted over a network typified by a telecommunication channel, a wireless or wired communication channel, and the Internet, data broadcasting, and so on.

Moreover, the present disclosure may be realized by a computer system including a microprocessor and a memory, the memory may store the computer program, and the microprocessor may operate in accordance with the computer program.

The present disclosure may also be implemented by another independent computer system by transporting the recording medium on which the program or the digital signals are recorded or transferring the program or the digital signals over the network or the like.

The present disclosure can be applied to information processing methods, information processing apparatuses, and programs that use CNNs and can particularly be applied to low-power-consumption embedded systems, such as systems in which information processing methods, information processing apparatuses, and programs that perform convolution operations in convolutional layers in CNNs are implemented on FPGAs or ASICs.

What is claimed is:
1. An information processing method comprising:
inputting an input tensor indicating data to a processor having a memory;
causing the processor to perform, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation, wherein the weight tensors have been converted into low-precision weight tensors; and
outputting, as an output tensor, the elements of the input tensor on which the convolution operation processing is performed.

2. The information processing method according to claim 1,
wherein the processor is caused to perform the precomputation and to store the precomputed elements of the input tensor in the memory.

3. The information processing method according to claim 1,
wherein during the convolution operation processing, the processor is caused to perform an arithmetic operation on a convolutional layer included in a convolutional neural network.

4. The information processing method according to claim 1,
   wherein the low-precision weight tensors comprise $2^B-1$ combinations, where B represents a bit value of two's complement and is an integer greater than or equal to 1, and are stored in the memory as a codebook; and
   wherein a low-precision weight tensor element identified with B and N, where N is a dimension number indicating a degree of freedom of a one-bit representation and is an integer greater than or equal to 1, is obtained from the codebook and is used for the convolution operation processing.

5. The information processing method according to claim 4,
   wherein N is an integer greater than or equal to 2.

6. An information processing apparatus comprising:
   an inputter that inputs an input tensor indicating data;
   a processor that has a memory and that performs, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation, wherein the weight tensors have been converted into low-precision weight tensors; and
   an outputter that outputs, as an output tensor, the elements of the input tensor on which the convolution operation processing is performed.

7. A non-transitory computer-readable recording medium storing a program causing a computer to execute:
   inputting an input tensor indicating data to a processor having a memory;
   causing the processor to perform, after elements of the input tensor are subjected to precomputation for conversion into a power-of-two format and are stored in the memory, convolution operation processing with only addition and shift operations by using the precomputed elements of the input tensor stored in the memory and weight tensors that are pre-converted into the power-of-two format in accordance with a predetermined algorithm, that are stored in the memory, and that indicate weights having a possibility of being used for a convolution operation, wherein the weight tensors have been converted into low-precision weight tensors; and
   outputting, as an output tensor, the elements of the input tensor on which the convolution operation processing is performed.

* * * * *